C. JUNKER.
CHEESE CURD MILL.
APPLICATION FILED FEB. 2, 1909.
971,506.
Patented Sept. 27, 1910.
2 SHEETS—SHEET 1.
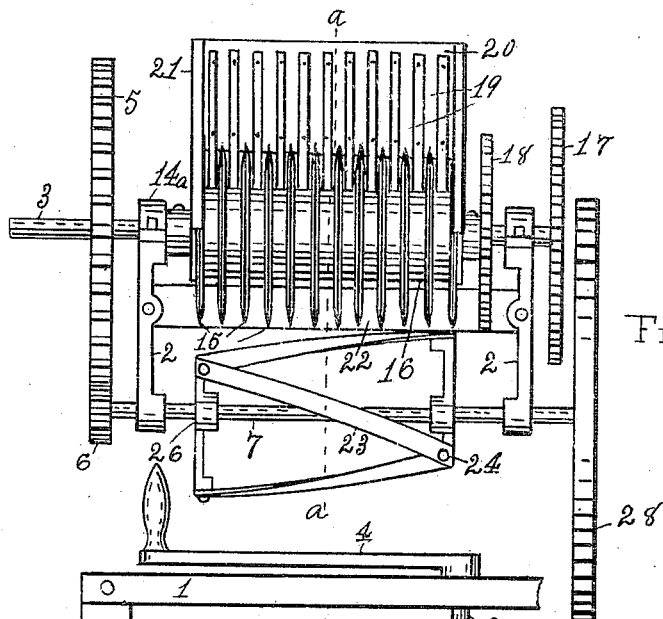
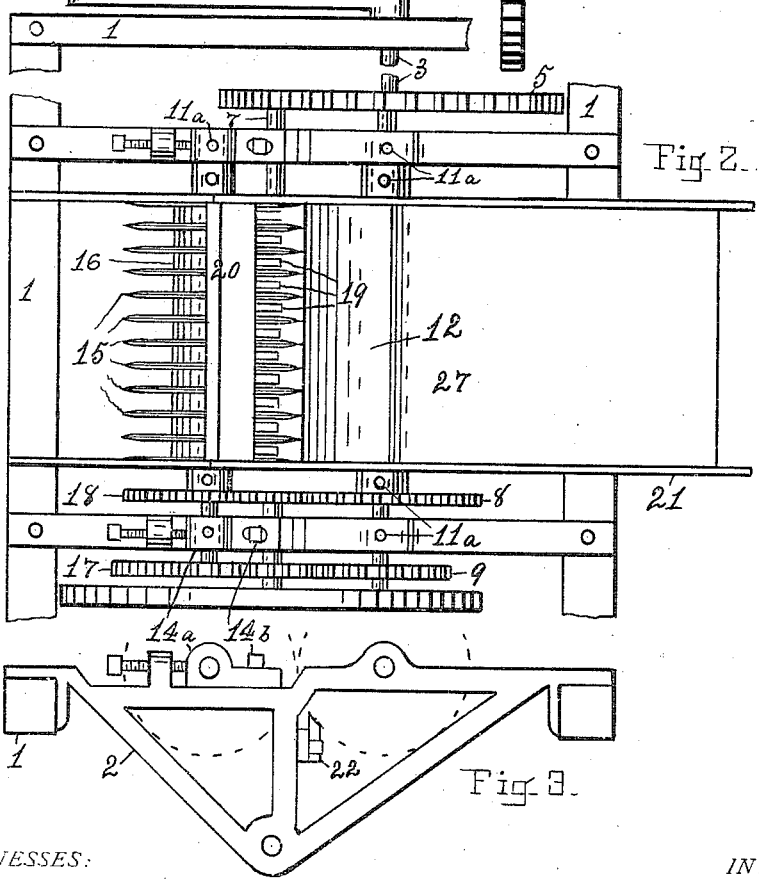
WITNESSES:
INVENTOR.
Charles Junker.
BY
Victor J. Evans ATTORNEY.

C. JUNKER.
CHEESE CURD MILL.
APPLICATION FILED FEB. 2, 1909.
971,506.
Patented Sept. 27, 1910.
2 SHEETS—SHEET 2.
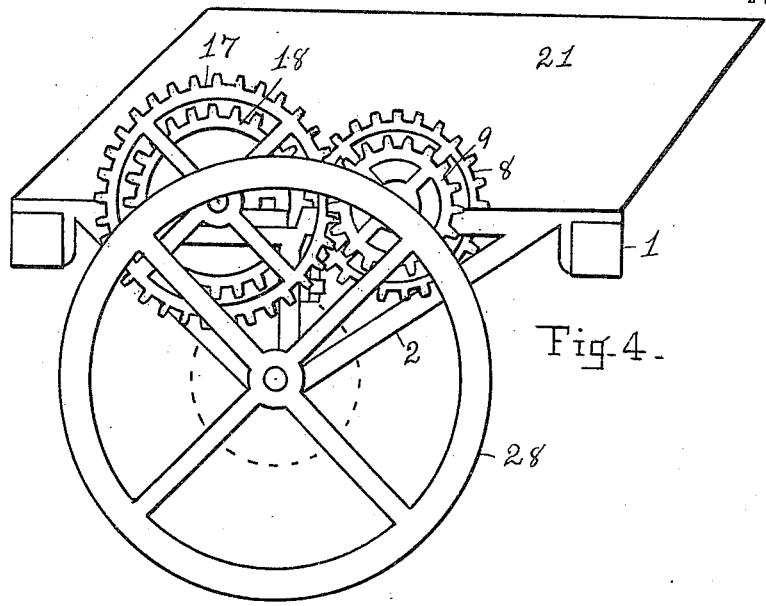
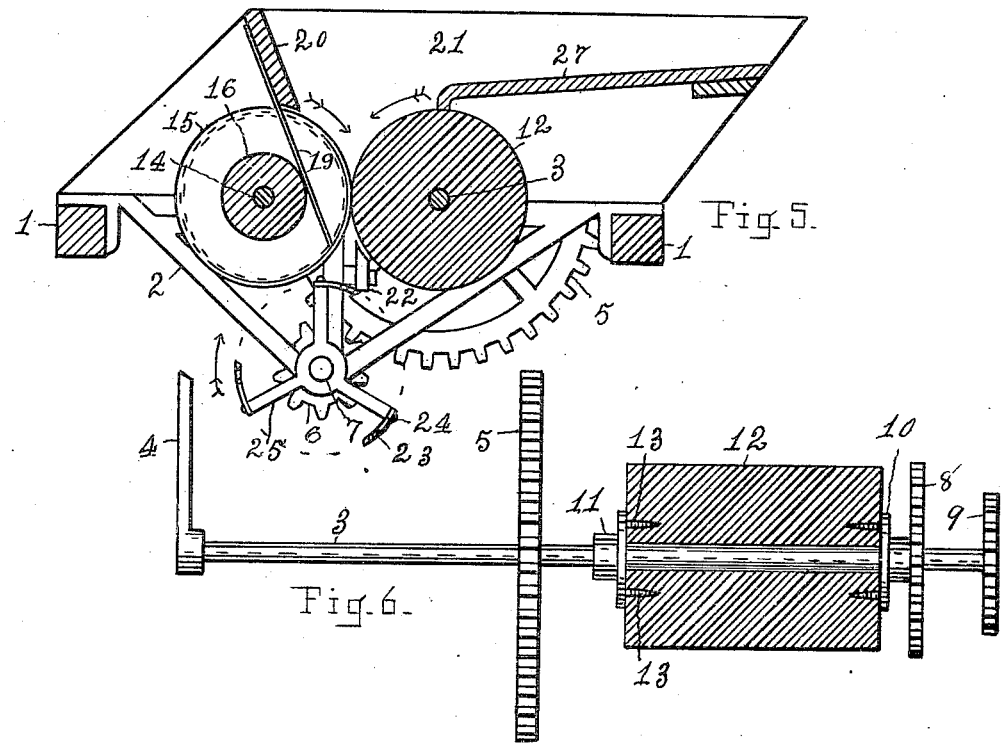
WITNESSES:
INVENTOR.
Charles Junker
BY
Victor J. Evans. ATTORNEY

UNITED STATES PATENT OFFICE.

CHARLES JUNKER, OF GREENLEAF, WISCONSIN.

CHEESE-CURD MILL.

971,506. Specification of Letters Patent. Patented Sept. 27, 1910.

Application filed February 2, 1909. Serial No. 475,713.

*To all whom it may concern:*

Be it known that I, CHARLES JUNKER, a citizen of the United States, and a resident of Greenleaf, in the county of Brown and State of Wisconsin, have invented a new and useful Cheese-Curd Mill, of which the following is a specification.

My invention relates to a cutting device for cutting cheese curd as it comes from the curd forming vat, into small cubes, as one stage of the process preparatory to packing it into cheese hoops for being pressed, and it consists of a hopper into which the curd is fed, after being cut with a suitable knife into sheets of a suitable width and thickness, the hopper being arranged to descend slightly and deliver the sheet of curd upon a revoluble wood roll, toward which the cutters revolve, said cutters being a dozen, more or less according to the size of the mill and the width of strips into which it is desired to cut the curd, of thin circular cutting disks of metal which engage with the circumference of said wood roll and cut the sheets of curd into long strips corresponding in width to the distance apart of said disks, the strips then passing on downward where they encounter a revolving cutter of the lawn mower type and are cut transversely into cubes measuring approximately $\frac{1}{2}$ to $\frac{3}{4}$ of an inch upon their sides, and the object of the invention is to facilitate the labor of cheese making and to vary the sizes of the cubes into which the curd is cut by simply changing two gear wheels for others of a different diameter.

My invention is shown in the accompanying drawing, in which,—

Figure 1 is an end view of the machine as seen from the left hand end of Fig. 2, the wood frame upon which it is mounted for use over a cheese vat being omitted and its crank shaft being broken off at the left of the figure. Fig. 2 is a plan of the mill, the wood frame pieces being broken at each side of the mechanism. Fig. 3 is a side elevation of the iron frame pieces, they being made "rights and lefts," this being for the right hand side. Fig. 4 is a side elevation showing the right hand side of Fig. 1. Fig. 5 is a transverse section of the machine upon the line *a*, *a*, of Fig. 1. Fig. 6 is a longitudinal section of the wood roll, with the shaft upon which it is mounted running through it and having the gear wheels which it carries in position thereon.

Similar numerals and letters indicate like parts in the several views.

1, indicates wood frame pieces which support the mechanism, and are intended to support it over a curd receptacle; 2, iron frames upon which the revolving parts are mounted; 3, a crank shaft carrying a crank 4, by which the mechanism may be revolved, but it may also be revolved by any suitable power motor. This shaft is provided with a gear wheel 5, for engaging with a pinion 6, on the lawn mower type of cutter shaft 7, for revolving said cutters rapidly, with a gear wheel 8, and a smaller one 9, the gears 5 and 9 being secured to the shaft and revolving with it, but the gear 8 is integral with the wood roll flange 10, which flange with its companion flange 11 are secured to the wood roll 12, with screws 13, the gear 8, its flange 10 and the flange 11 with the wood roll between them being loose upon the shaft 3, oil holes 11$^a$, being provided for lubrication where needed. A shaft 14 is mounted parallel with the shaft 3, on which are secured a series of circular disk cutters 15, which are spaced apart with collars 16, said shaft being provided with a gear wheel 17, which is engaged by the gear wheel 9 on the shaft 3, by means of which the disk cutters are revolved, and with a gear wheel 18, which engages with the loose gear wheel 8 and revolves the wood roll, said roll and disks revolving toward each other, and the cutting edges of the disks engaging with the outer surface of the roll, the sheets of curd when fed to said cutters will be cut into long narrow strips. For adjusting the disks so that their cutting edges will engage the surface of the roll as desired, it will be observed that the shaft 14 is journaled in the slotted journal boxes 14$^a$, which boxes can be moved nearer to or farther from the shaft 3, and be held in position by means of bolts 14$^b$.

For preventing the strips from winding around the disks and wood roll, thin narrow strips of metal 19, are attached to the cross piece 20, of the hopper 21, and are extended downward between the disks a sufficient distance below the center of said disks, and a steel doctor bar 22, having its ends bolted to the side frames 2 and serving as a tie between said frames, is arranged alongside of the roll for preventing the strips of curd from winding around it. The flat side of the bar is arranged in a vertical position, its inner lower edge being straight and serving as a shear edge under which the blades 23 of the revolving cutters revolve and cut the strips of curd as they are fed downward between the disks and roll, into cubical blocks of small dimensions, which can then fall into a suitable receptacle.

It will be observed that the gears 8 and 18, on the wood roll and cutting disk shafts respectively, are of the same diameter, and consequently, the roll and disks revolve at the same rate of speed, but that the gear on the shaft 3 which drives the cutting disk shaft is but one half as large as the gear 18, and consequently, the shaft 3 revolves twice while the wood roll and cutting disks revolve once, also, that the gear wheel 5 is about five times the diameter of the pinion 6 on the shaft 7, so that one revolution of the roll and cutting disk results in ten of the shaft 7, and there being three of the blades 23, there will be thirty cuts of a blade to each revolution of the wood roll and cutting disks, and thus cutting the strips of curd into cubes of small dimensions, but a little more than one half inch in length.

The number of revolutions of the blades 23 can be made more or less to one of the shaft 3, by simply changing the diameters of the gear wheels 9 and 17, and thereby cutting the strips shorter or longer as desired. The blades 23, are secured with bolts 24 to spiders 25, which spiders are secured upon the shaft 7 with bolts 26. The hopper 21 is provided with a bottom 27, upon which to rest the sheets of curd as it is fed into the mill.

Having described my invention, what I claim and desire to secure by Letters Patent, is,—

A cheese cured mill comprising a hopper, a roller rotatably mounted beneath the hopper, a series of parallel disks rotatably mounted beneath the hopper and having their peripheral edges arranged in direct contact with the surface of the roller, the said disks and the said rollers, respectively, being arranged immediately beneath the throat of the hopper to permit a direct gravity feed of material between the disks and roller, respectively, a shearing member extending longitudinally of the roller and beneath the longitudinal axis thereof, a cutting knife mounted immediately beneath the said disks and roller, respectively, and having its blades formed to coöperate with the said shearing member, and a series of deflecting plates extending downwardly between the disks and rollers, respectively, and having their lower ends arranged immediately at one side of the shearing member.

CHARLES JUNKER.

Witnesses:
 ROBERT A. KAFTAN,
 JOSEPHINE KITTNER.